US008539459B2

(12) United States Patent
Stiemens et al.

(10) Patent No.: US 8,539,459 B2
(45) Date of Patent: Sep. 17, 2013

(54) CODE OBFUSCATION AND CONTROLLING A PROCESSOR BY EMULATION

(75) Inventors: Alan Walter Stiemens, Berkshire (GB); Martin Clive Gray, Berkshire (GB); Christopher Edward Sulley, West Yorkshire (GB)

(73) Assignee: Rovi Europe Limited, Maidenhead (GB)

( * ) Notice: Subject to any disclaimer, the term of this patent is extended or adjusted under 35 U.S.C. 154(b) by 1883 days.

(21) Appl. No.: 10/567,948

(22) PCT Filed: Aug. 19, 2004

(86) PCT No.: PCT/GB2004/003560
§ 371 (c)(1),
(2), (4) Date: Feb. 10, 2006

(87) PCT Pub. No.: WO2005/020068
PCT Pub. Date: Mar. 3, 2005

(65) Prior Publication Data
US 2006/0218539 A1    Sep. 28, 2006

(30) Foreign Application Priority Data

Aug. 20, 2003    (GB) .................................. 0319596.3

(51) Int. Cl.
*G06F 9/45*    (2006.01)
*G06F 12/14*    (2006.01)

(52) U.S. Cl.
USPC ........... 717/138; 717/136; 717/137; 717/140; 713/190; 713/193

(58) Field of Classification Search
None
See application file for complete search history.

(56) References Cited

U.S. PATENT DOCUMENTS 6,006,328 A * 12/1999 Drake .............................. 726/23
6,092,202 A *  7/2000 Veil et al. ........................ 726/27

(Continued)

FOREIGN PATENT DOCUMENTS

EP            1 349 036 A3      8/2004
WO       WO 97/48203          12/1997

(Continued)

OTHER PUBLICATIONS

Gregory Wroblewski, "General Method of Program Code Obfuscation", [on line], 2002, pp. 1-112, [Retrieved from Internet on Dec. 24, 2012], <http://citeseerx.ist.psu.edu/viewdoc/download?doi=10.1.1.19.9052&rep=rep1&type=pdf>.*

(Continued)

*Primary Examiner* — Thuy Dao
*Assistant Examiner* — Ziaul A Chowdhury
(74) *Attorney, Agent, or Firm* — Inventive Patent Law P.C.; Jim H. Salter

(57) ABSTRACT

An individual security program is randomly chosen by way of a respective key and is then packaged with a games program to provide an executable program file which is applied to a storage media, such as an optical disc. Whenever the security program is running, the object code it produces is obfuscated to make it difficult to overcome the protection by identifying and removing the security program. The obfuscated object code is produced by substituting a variable in source code with a function of the variable. When the source code is compiled to produce the object code, the function causes the variable to be presented in the compiled object code as a series of operations.

21 Claims, 3 Drawing Sheets

(56) References Cited

U.S. PATENT DOCUMENTS

Figure 1:
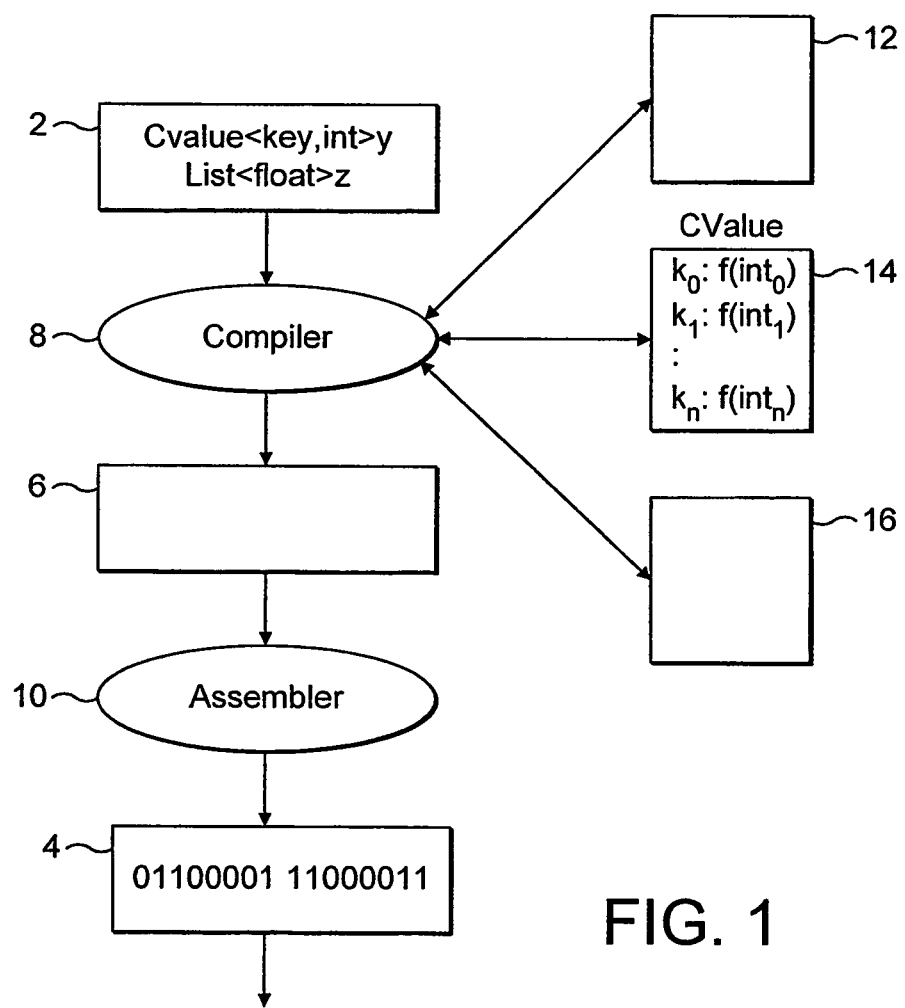

| | | | |
|---|---|---|---|
| 6,151,618 A * | 11/2000 | Wahbe et al. | 718/1 |
| 6,298,434 B1 * | 10/2001 | Lindwer | 712/209 |
| 6,467,075 B1 * | 10/2002 | Sato et al. | 716/103 |
| 6,480,959 B1 | 11/2002 | Granger et al. | |
| 6,594,761 B1 * | 7/2003 | Chow et al. | 713/190 |
| 6,643,775 B1 * | 11/2003 | Granger et al. | 713/190 |
| 6,665,796 B1 * | 12/2003 | Folmsbee | 713/190 |
| 6,668,325 B1 * | 12/2003 | Collberg et al. | 713/194 |
| 6,684,389 B1 * | 1/2004 | Tanaka et al. | 717/140 |
| 7,254,586 B2 * | 8/2007 | Chen et al. | 713/190 |
| 7,272,725 B2 * | 9/2007 | Cuenod et al. | 713/193 |
| 7,587,616 B2 * | 9/2009 | Jakubowski | 713/190 |
| 7,779,394 B2 * | 8/2010 | Horning et al. | 717/136 |
| 8,161,463 B2 * | 4/2012 | Johnson et al. | 717/136 |
| 2002/0092003 A1 * | 7/2002 | Calder et al. | 717/138 |
| 2002/0194243 A1 * | 12/2002 | Sokolov et al. | 709/101 |
| 2003/0070083 A1 * | 4/2003 | Nessler | 713/193 |
| 2004/0003278 A1 * | 1/2004 | Chen et al. | 713/200 |
| 2004/0039926 A1 * | 2/2004 | Lambert | 713/189 |
| 2004/0073904 A1 * | 4/2004 | Hill | 718/1 |
| 2004/0086119 A1 * | 5/2004 | Moskowitz | 380/205 |
| 2005/0183072 A1 * | 8/2005 | Horning et al. | 717/140 |
| 2006/0130016 A1 * | 6/2006 | Wagner | 717/136 |
| 2010/0077228 A1 * | 3/2010 | Graunke | 713/190 |
| 2011/0271260 A1 * | 11/2011 | Kwon et al. | 717/138 |

FOREIGN PATENT DOCUMENTS

| | | |
|---|---|---|
| WO | WO 99/01815 | 1/1999 |
| WO | WO 00/72112 A3 | 11/2000 |
| WO | WO 00/77596 A1 | 12/2000 |
| WO | WO 00/77597 A1 | 12/2000 |
| WO | WO 01/14953 A1 | 3/2001 |
| WO | WO 01/79969 A2 | 10/2001 |

OTHER PUBLICATIONS

Mihai Christodorescu, "Semantics-Aware Malware Detection", [Online], 2005, pp. 1-16, [Retrieved from Internet on Dec. 24, 2012], <http://repository.cmu.edu/cgi/viewcontent.cgi?article=1031&context=ece>.*

Mila Dalla Preda et al., "A Semantics-Based Approach to Malware Detection" ACM 2008, pp. 1-54, [Retrieved from Internet on Dec. 24, 2012], <http://citeseerx.ist.psu.edu/viewdoc/download?doi=10.1.1.144.7489&rep=rep1&type=pdf>.*

Vytautas Stuikys et al., "Taxonomy of the Program Transformation Process", [Online], 2002, pp. 39-52, [Retrieved from internet on Dec. 24, 2012], <http://citeseerx.ist.psu.edu/viewdoc/download?doi=10.1.1.16.2599&rep=rep1&type=pdf>.*

Henry Stern, "A Survey of Modern Spam Tools", [Onlince], 2008, pp. 1-10, [Retrieved from Internet on May 18, 2013], <http://citeseerx.ist.psu.edu/viewdoc/download?doi=10.1.1.161.1851&rep=repl&type=pdf>.*

Mikhail Sosonkin et al. "Obfuscation of Design Intent in Object-Oriented Applications", [Online], ACM, 2003, pp. 142-153, [Retrieved from Internet on May 19, 2013], <http://delivery.acm.org/10.1145/950000/947399/p142-sosonkin.pdf>.*

Mohammed Fadel Mokbel, "An embellished macro descriptive language for reverse assembly cod",[Online], IEEE-2009, pp. 26-39, [Retrieved from Internet on May 18, 2013], <http://mfmokbel.com/Pubs/MFMokbel_IEEEPOT_2010.pdf>.*

Stefan Monnier et al., "Inlining as Staged Computation", [Online], 2003, pp. 1-29, [Retrieved from Internet on May 18, 2013], <http://citeseerx.ist.psu.edu/viewdoc/download?doi=10.1.1.107.9365&rep=repl&type=pdf>.*

GB Search Report for GB 0319596.3 dated Jan. 10, 2005, 1 page.

PCT Search Report for PCT/GB2004/003560 dated Sep. 20, 2005, 2 pages.

Collberg, Christian, et al., A Taxonomy of Obfuscating Transformations, Technical Report #148, Department of Computer Science, The University of Auckland, Jul. 1997, 36 pages.

Meyers, Scott, Effective C++, Second Edition, Japan, ASCII Corporation, May 1, 1998, p. 214.

Sato, Hirotsugu, et al., Program Obfuscation by Coding Data and Its Operation, IEICE Technical Report, IT2002-47-44, vol. 102, No. 741, Japan, the Institute of Electronics, Information and Communication Engineers (IEICE), Mar. 26, 2003, pp. 13-18, Abstract is translated, Summary of Document in English, 2 pages.

* cited by examiner

CODE OBFUSCATION AND CONTROLLING A PROCESSOR BY EMULATION

The present invention relates to a method of producing obfuscated object code, an executable program in object code, a method of producing storage media having a secured executable program thereon, and a storage media having a secured executable program thereon. The present invention also relates to a method of controlling a processor to run a program.

In general, this invention relates to software security. It is well known that software can be valuable, and that there are persons and organisations who seek to circumvent any security measures applied to protect the software.

Programs are written in high level languages such as C and Fortran. They are then compiled into object code, which may be machine language or may be transformed into machine language. Devices, such as compilers, are available to make the translation of a source code into an object code. The machine language is a stream of binary digits which will include the instructions for an executable program but may also include various security means, for example, to ensure that only genuine copies of programs can be run. Crackers seek to obtain clear code so that they can circumvent any security means and they are helped in this as, for example, reverse compilers which will produce source code from a binary stream are available.

It has been suggested to pad the object code, that is, to add redundant additional code, to hide or obfuscate the functional object code but crackers have proved adept at recognising and removing the padding. It has also been suggested that the object code be encrypted. However, an encryption key needs to be available when the program is run so that the instructions can be decrypted. It will be apparent that once a cracker finds the key, access to the unencrypted code is provided.

The present invention seeks to provide new and improved methods of securing software.

According to a first aspect of the present invention there is provided a method of producing obfuscated object code, the method comprising the steps of substituting a variable in source code with a selected function of the variable, and compiling the source code to produce object code, the selected function causing the variable to be presented in the compiled object code as a series of operations.

As variables are compiled into series of operations, the size of the object code is increased and this, in itself, acts to hide or obscure the useful code. However, the provision of a series of operations to present one variable has the advantage over the padding of codes that all of the resultant code appears to be useful making it much more difficult for crackers to determine which object code they need.

In a preferred embodiment, the series of operations by which the variable is presented is made up of arithmetic and/or logical operations, and the series of operations is arranged, upon running of the object code, to provide the variable. Additionally and/or alternatively, the series of operations by which the variable is presented comprises complementary operations arranged, upon running of the object code, to provide the variable.

In this respect, the length of the object code is greatly increased, and the object code is thereby obfuscated, by presenting a variable, for example, as a series of arithmetic or other operations.

In an embodiment, the selected function is defined in a template of the source code.

For example, the template of the source code defines a plurality of functions which are each arranged to compile to present the variable as a series of operations, and the method further comprises selecting one of the functions to substitute for the variable in the source code.

Preferably a different key is associated with each one of the functions in the template, and the method further comprises substituting the variable in source code with the template and selecting one of the functions in the template by selecting the key which is associated with said one function.

The provision of a plurality of functions which may each be selected to substitute for the variable enables a particular variable to be compiled in a number of different ways. This is particularly helpful where one source is producing many different software applications. For example, a manufacturer of CDs will produce CDs with different titles and contents but will keep formats and security measures common across all titles. In many prior art security solutions, a cracker only needs to crack the protection on one title to be enabled to crack all titles by replicating the actions made.

The provision of a plurality of functions, as defined above, enables a different function to be chosen for the same variable for each different title. The crackers' endeavours to access the contents of one CD title, therefore, are not assisted if the cracker does manage to access the contents of another CD title. In addition, the use of a key method to select the functions enables some automation of the process of securing the software.

In an embodiment, the source code involves stored arrays and templates and utilises pointers to navigate the arrays and templates.

Preferably, the source code is a standard programming language. For example, the source code is $C^{++}$.

The present invention also extends to an executable program in object code, the program having been compiled from source code, wherein a variable in the source code has been compiled to be presented in object code as a series of operations whereby the object code is obfuscated.

The series of operations by which the variable is presented may be made up of arithmetic and/or logical operations, and the series of operations arranged, upon running of the object code, to provide the variable. Additionally and/or alternatively, the series of operations by which the variable is presented may comprise complementary operations arranged, upon running of the object code, to provide the variable.

The use of a series of operations which are arranged, upon running of the object code, to provide the variable enables the instructions of the object code, or transformed from the object code, to run the program without it being necessary to decrypt or otherwise interpret the obfuscated object code.

In an embodiment, the series of operations has been produced by substituting the variable in the source code with a selected function arranged to cause the variable to be presented in the compiled object code as a series of operations.

For example, the selected function was defined in a template of the source code.

Preferably, the template of the source code had defined a plurality of functions which were each arranged to compile to present the variable as a series of operations, and one of the functions had been selected to substitute for the variable in the source code.

According to a further aspect of the present invention there is provided a method of producing storage media having a secured executable program thereon, the method comprising the steps of securing an executable program by associating the executable program with a security program which is arranged to control access to the executable program, and applying the secured executable program to the storage media, and the method further comprising obfuscating the object code of the security program, wherein the object code of the security program has been obfuscated by substituting a variable in source code with a selected function of the variable, and compiling the source code to produce object code, the selected function causing the variable to be presented in the compiled object code as a series of operations.

In an embodiment, the series of operations by which the variable is presented is made up of arithmetic and/or logical operations, and wherein the series of operations is arranged, upon running of the object code, to provide the variable. Additionally and/or alternatively, the series of operations by which the variable is presented comprises complementary operations arranged, upon running of the object code, to provide the variable.

Preferably, the executable program and the security program are associated at object code level.

The security program which is provided to control access to the executable program may be any suitable security program. For example, the security program may be arranged to encrypt the executable program, and/or blocks of the executable program may be moved into the security program, and/or the security program may be arranged to require the running of an authentication program.

In an embodiment, the selected function in the source code of the security program is defined in a template of the source code.

For example, said template of the security program source code defines a plurality of functions which are arranged to compile to present the variable as a series of operations, and the method further comprises selecting one of the functions to substitute for the variable in the source code.

Preferably, a different key is associated with each one of the functions in the template, and the method further comprises substituting the variable in source code with the template and selecting one of the functions in the template by selecting the key which is associated with said one function.

In an embodiment, the source code of the security program involves stored arrays and templates and utilises pointers to navigate the arrays and templates.

The source code of the security program is preferably a standard programming language such as $C^{++}$.

Preferably, the storage media onto which the secured executable program is applied is an optical disc and, for example, the secured executable program is applied onto the optical disc by laser beam encoding.

Alternatively, the storage media onto which the secured executable program is applied is memory in, or associated with, servers, computers and/or other processing means. For example, the storage media may be a hard disc in, or connected to, a computer.

The present invention also extends to a storage media having a secured executable program thereon, wherein an executable program is secured by having a security program associated therewith, the security program being arranged to control access to the executable program, and wherein the security program is in object code which has been obfuscated, the security program having been compiled from source code, and a variable in the source code of the security program having been compiled to be presented in object code as a series of operations whereby the object code has been obfuscated.

For example, the series of operations by which the variable is presented is made up of arithmetic and/or logical operations, and wherein the series of operations is arranged, upon running of the object code, to provide the variable. Additionally and/or alternatively, the series of operations by which the variable is presented comprises complementary operations arranged, upon running of the object code, to provide the variable.

In an embodiment, the series of operations has been produced by substituting the variable in the source code of the security program with a selected function arranged to cause the variable to be presented in the compiled object code as a series of operations.

For example, the selected function was defined in a template of the source code.

In an embodiment, the template of the source code had defined a plurality of functions which were each arranged to compile to present the variable as a series of operations, and one of the functions had been selected to substitute for the variable in the source code.

Preferably, the executable program and the security program are associated at object code level.

The executable program may be encrypted on the storage media and the associated security program is then arranged to enable decryption of the executable program.

Additionally and/or alternatively, blocks from the executable program may have been relocated within the security program.

Additionally and/or alternatively, the security program may be arranged to require the running of an authentication program.

Where the security program is arranged, for example, to require the running of an authentication program, that authentication program will also be provided on the storage media. It would be possible for the security program to incorporate the authentication program, but currently it is generally preferred that the security program points to the authentication program.

In an embodiment, the storage media is an optical disc on which the executable program and the security program are encoded. For example, the optical disc is a CD, a CD-ROM, or a DVD.

In an alternative embodiment, the storage media is memory in, or associated with, servers, computers and/or other processing means and on which the executable program and the security program are stored. For example, the storage media may be a hard disc in, or connected to, a computer.

The executable program is a games program, and/or a video program, and/or an audio program, and/or other software.

In this latter respect it will be appreciated that the securing methods defined above are generally applicable to all software applications. The executable programs provided on the storage media may comprise games programs and/or video programs, and/or audio programs and/or any other multimedia formats.

A method of producing obfuscated object code, and/or an executable program in object code, and/or a method of producing storage media having a secured executable program thereon, and/or a storage media having a secured executable program thereon as defined above may each be used alone or in conjunction with a method of controlling a processor to run a program, and/or a storage media having a secured executable program thereon as defined below.

According to a still further aspect of the present invention there is provided a method of controlling a processor to run a program comprising the steps of translating instructions from the program into a reduced instruction set format to which said processor is not responsive, causing the translated instructions to be applied to a virtual processor which is responsive to the reduced instruction set format, and causing the virtual processor to run the instructions applied thereto and to apply a series of simple instructions, to which the processor is responsive, to the processor.

Generally, the instructions from a program which are applied to a processor, such as a CPU, are clear and it is possible for crackers to access the instructions during running of the program to get access to the program. With a method of the invention, the translated instructions applied to a virtual processor, that is a processor configured in software, are not the standard instructions generally used and therefore are not useful to the cracker. Furthermore, the series of simple instructions which are applied to the processor are greater in number than would be usual and thus obfuscate the instructions.

In a preferred embodiment, the method further comprises encrypting the translated instructions to be applied to the virtual processor, and enabling the virtual processor to respond to the encrypted instructions without decrypting them.

One weakness of encryption techniques is that a key or other device has to be provided to enable decryption. Crackers have experience of identifying such a key. However, methods of the invention do not require the virtual processor to decrypt the translated instructions in order to run the instructions so that no key is provided. Decryption can be avoided by providing in the virtual processor information enabling the virtual processor to understand each encrypted instruction and to produce appropriate actions in response thereto. In this way, the virtual processor never works with clear instructions which might be accessed by crackers.

It is also proposed that more than one series of instructions in the reduced instruction set format be provided which could be substituted for each instruction from the program. Each series of instructions is different whereby individual virtual processors can receive translated instructions which differ from those received by other virtual processors. This can be achieved by the use of templates.

Thus, in a preferred embodiment, the method further comprises utilising templates to translate and encrypt the instructions, a selected template providing a series of instructions in the reduced instruction set format for each instruction from the program.

For example, the templates define a plurality of series of instructions in the reduced instruction set format for an instruction in the program, the method further comprising selecting one of said plurality of series of instructions to be the translation for said instruction.

Preferably, a different key is associated with each one of the plurality of series of instructions in the reduced instruction set format in the template, and the method further comprises selecting a key which is associated with one of said plurality of series of instructions and translating the instruction in the program to the one of said plurality of series of instructions which is associated with the selected key.

As explained previously, the use of keys enables some automation of the programming required to perform the method.

It will be appreciated that the use of a virtual processor to act on translated instructions from a program and then to provide a large number of simple instructions to a processor would add unacceptable delays if this method of control were used, for example, for running a games program. Accordingly, it is proposed that only parts of the program be subject to processing by the virtual processor.

A method of controlling a processor as defined above may be used alone or may be used in conjunction with a method of producing obfuscated object code, and/or an executable program in object code, and/or a method of producing storage media having a secured executable program thereon, and/or a storage media having a secured executable program thereon as defined above.

The present invention also extends to a storage media having a secured executable program thereon, wherein an executable program is secured by having a security program and an emulation program associated therewith, the security program being arranged to control access to the executable program, and the emulation program causing predetermined functions or routines of the executable program to be run on a virtual processor provided by said emulation program, wherein the emulation program is arranged to translate instructions from the executable program into a reduced instruction set format, to cause the translated instructions to be applied to the virtual processor, and to cause the virtual processor to run the instructions applied thereto and to output a series of simple instructions for application to a processor.

Figure 2:
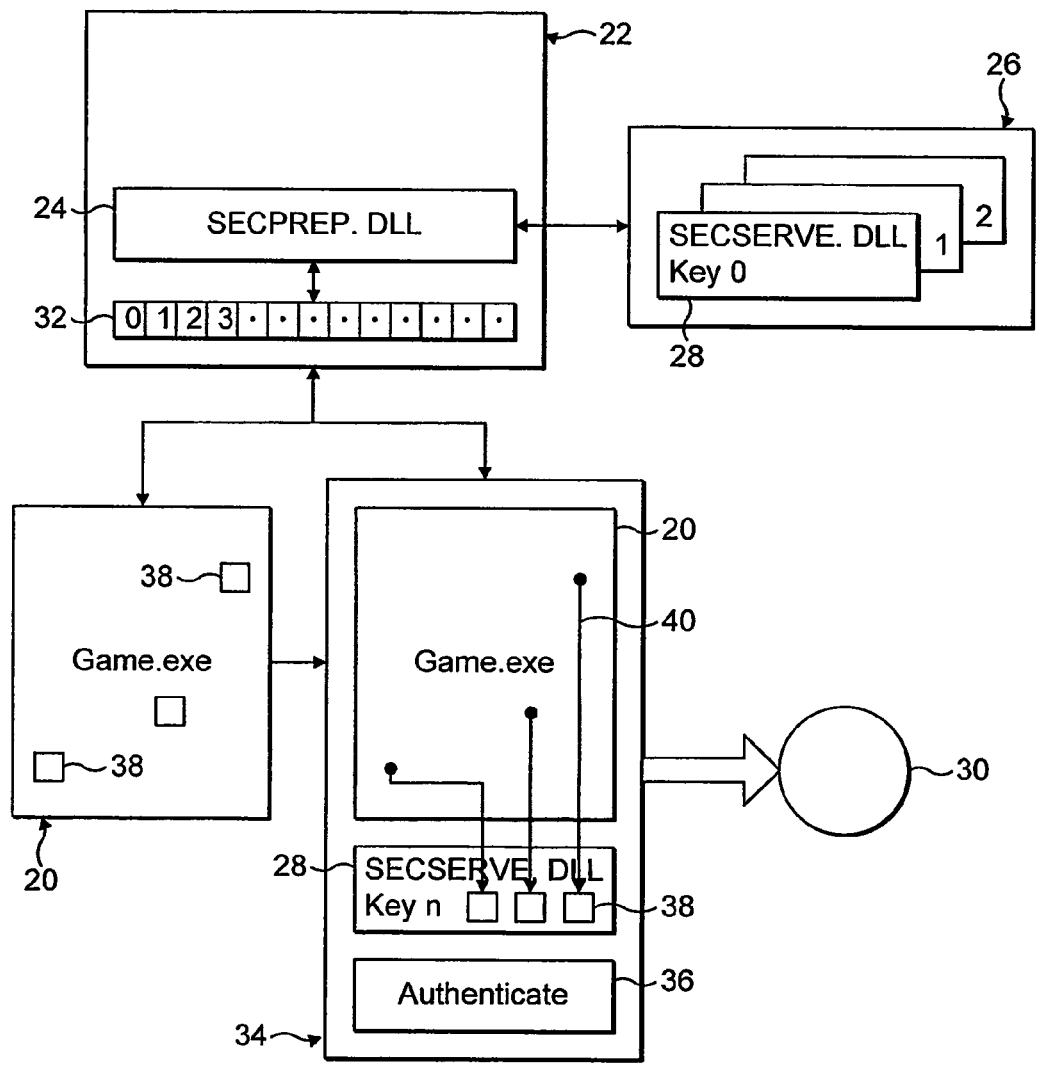
Figure 3:
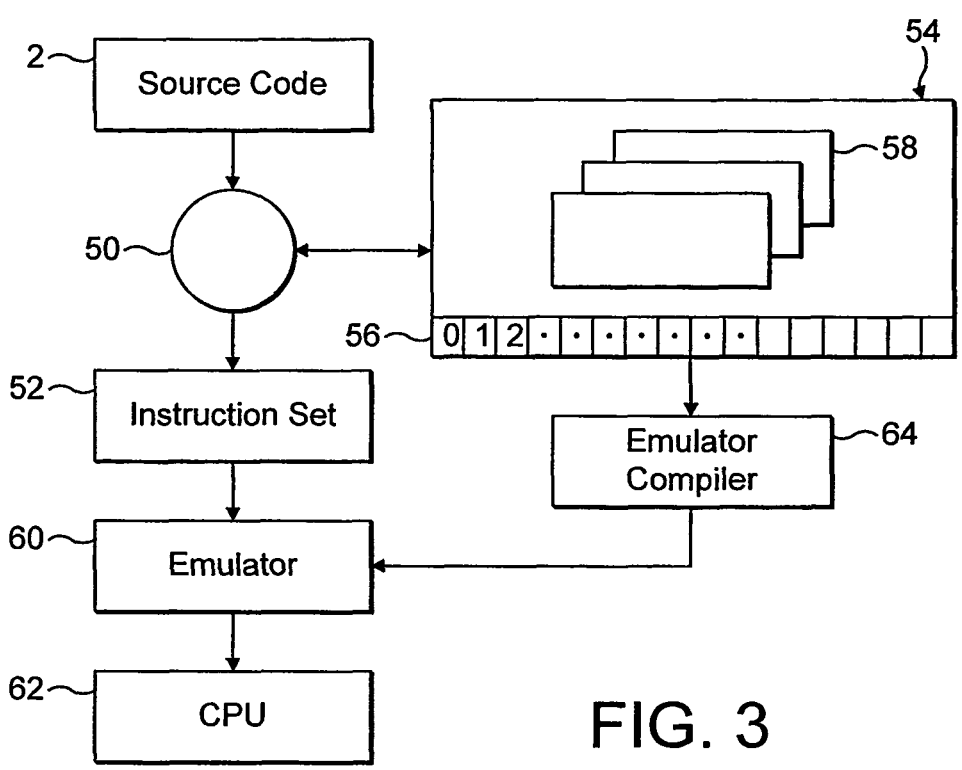

Embodiments of the present invention will hereinafter be described, by way of example, with reference to the accompanying drawings, in which:

FIG. 1 shows schematically the translation of a high level source code into machine language and illustrates the use of templates by a compiler;

FIG. 2 schematically illustrates the production of an optical disc with a secured executable program; and FIG. 3 illustrates the use of a virtual processor in a method of controlling a processor of the invention.

Embodiments of the present invention are described below and illustrated, with reference to executable programs such as games programs, which are provided on optical discs such as CD-ROMs or DVDs. However, it will be appreciated that the present invention is not restricted to the particular examples given and in particular is applicable to all software and to any storage media for storing the software.

For example, the present invention may be used with software which is stored on memory in, or associated with, personal computers and/or servers and/or other processing means and/or with software arranged to be downloaded to computers. It is noted particularly that the present invention can be used in conjunction with digital rights management software.

FIG. 1 shows the translation of source code, indicated at 2, into a machine language, that is a sequence of binary digits, indicated at 4. As is shown, the source code 2 which is generally a high level language, for example, C, C$^{++}$, or Fortran, is translated into object code 6 by way of a compiler 8.

In some instances, depending upon the language of the source code 2 and the nature of the compiler 8, the object code 6 is the same or substantially similar to the machine language 4. In the embodiment illustrated in FIG. 1, the object code 6 is translated by an assembler 10 to provide the machine language 4.

The method illustrated in FIG. 1 is applicable irrespective of the type of the source code 2, but it is described and illustrated further with particular reference to C$^{++}$ source code 2. C$^{++}$ is a particularly flexible language as it uses, as indicated in FIG. 1, templates and arrays generally indicated at 12, 14, and 16. The template 14 of FIG. 1 has been indicated as CValue and this is a class template which is to be used in the present invention to obfuscate the object code 6 produced from the source code 2.

To give a very simple example, a program written in C might set the values of variables, such as int i and int j as set out below:

int i=5 int j=i+6

As can be seen in FIG. 1, the template CValue provides for each of keys $k_0, k_1 \ldots$ to $k_n$ an associated function of a variable, namely functions $f(int_0), f(int_1) \ldots f(int_n)$. Each of these functions is different and each involves, for example, a series of arithmetic or logical operations.

When using the illustrated method, a programmer replaces the values of variables in the source code with specified functions from the CValue template 14. Thus, instead of int i=5 the source code will specify CValue<key, int>i=5. Accordingly, during compilation of the source code 2 to form the object code 6 the variable int i which was to be set to 5 will be replaced by the series of operations defined by the appropriate function $f(int_0), f(int_1) \ldots f(int_n)$ as determined from the CValue template 14 by selecting one of the keys $k_0, k_1 \ldots k_n$.

As set out above, variables in the source code have been replaced by, for example, a series of mathematical operations. This causes obscurity in or obfuscation of the resulting object code 6. Thus, instead of setting int i to 5, for example, $f(int_0)$ might specify the following sequence of operations:

$m=5+key$ $n=6+key$ $p=m+n$ $l=p-(2 \times key)$ int $l=i$.

In this manner, the variable i has been set to 5 but in a series of operations. In the object code 6 output by the compiler 8 all of the operations indicated will appear to be useful so that a cracker will have difficulty in comprehending where the obfuscation arises. Of course, as the operations lead eventually to the correct value for the required variable, the object code 6, or the machine language 4 assembled therefrom can be directly run by a processor without the need for any decryption or decoding.

The operations carried out on the variables in this manner will generally be much more complex than those set out above. In addition, rather than using a series of simple arithmetic operators such as plus, divide, subtract and multiply, it will generally be preferred to use functions such as XOR which can reliably return a variable to its assigned value. In this respect, a technique which may be used in practice is set out below.

This technique uses C++ templates to implement $V^q$ where:

```
template<class T, int x = 0, int z = 0>
struct V
{
  T operator ( ) (T x, T v, T z)
  {
    T y = x ^ z;
    return (T) (v ^ y);
  }
  T operator ( ) (T v)
  {
    T y = x ^ z;
    return (T) (v ^ y );
```

```
  }
};
int main (int argc, char* argv [ ] )
{
  int z = T_MANGLE_SEED_VALUE_M;
  int y = T_MANGLE_SEED_VALUE_N;
  if (12345678 == argc)
  {
    // This never happens
    z = T_MANGLE_SEED_VALUE_O;
    y = T_MANGLE_SEED_VALUE_P;
  }
  int a = V<int, T_MANGLE_SEED_VALUE_N,
       T_MANGLE_SEED_VALUE_M> ( ) (argc);
  // Here a == V^q
  int b = a;
  return = V<int> ( ) (y, b, z);
}
```

Looking at the generated code, we see q's components (N and M) are used to mangle the value, and then q is used at run time to unmangle the value. This is asymmetric, in that no single value is used in the encrypt/decrypt cycle.

It will be apparent from the above that the method causes variables in the source code to be presented in the object code as a series of operations. This adds complexity and obscurity to the object code and provides protection against crackers.

In addition, the provision of different functions which can be selected by selection of an associated key enables different object codes to be generated to perform the same function. Thus, one title of a game can be provided in the same format as a second title. However, each title can have different object code. Therefore, if a cracker manages to crack the code of the first title this will not provide assistance for the cracking of the second title.

FIG. 2 shows schematically a method of applying a secured game to a CD-ROM 30. In this respect, and as indicated above, the invention is only exemplified by reference to a games program stored on an optical disc. The invention can be used to secure any software which is stored on any media. Thus, for example, the invention may be used to secure executable programs stored on memory in, or associated with, servers, computers, and/or other processing means. The invention is particularly useful where it is wished to download the executable programs, for example, using rights management software to ensure that only authorised users have access to the secured executable programs and/or to control the degree or manner of the access to the secured executable programs by users.

In the embodiment illustrated in FIG. 2, the game comprises a game program game.exe 20 and this is to be applied to the CD-ROM 30 with appropriate security software. In this respect, a software toolkit 22 provides the programs necessary to protect the game program 20. The toolkit 22 includes a security applying program SECPREP.DLL 24 which acts to access an appropriate security program 28 which is to be wrapped with the games program 20. In this respect, the security applying program 24 accesses one of a number of security programs SECSERV.DLL 28 which are appropriately stored in memory 26. Each individual security program 28 is associated with a respective key 32 and the security applying program 24 randomly chooses one the keys 32 whereby the corresponding security program 28 is selected. Thereafter, the selected security program 28 is packaged with the games program 20 and with any other security measures to form an executable program file 34 which is then stored, that is, in this example, applied to the CD-ROM 30 by appropriate encoding means (not shown).

In the embodiment illustrated in FIG. 2 the toolkit 22 has not only packaged the games program 20 with the security program 28, but it has also provided an authentication program 36.

The security program 28 acts as a wrapper for the games program 20 and the authentication program 36. Thus, when the executable application file 34 is accessed by a user putting the CD-ROM 30 into a drive in a computer, the security program 28 requires the authentication program 36 to run. For example, and in known manner, the authentication program 36 may look for known errors on the disc 30, which errors will have been put on the disc 30 during the production process described above. The disc will be declared genuine if the expected errors are found and in that case the security program 28 will then enable the loading and running of the game program 20. In this respect, whenever the security program 28 is running the object code it produces will be obfuscated as described above, making it difficult for crackers to identify and remove the security program 28. This prevents the crackers from gaining access to the games program 20.

The security offered by the security program 28 can be improved by, for example, taking blocks of programming, for example, as indicated at 38, from the games program and incorporating them in the security program 28. Pointers 40 to the blocks 38 are provided in the games program 20. By this technique parts of the game program itself are also hidden from crackers by the obfuscated code which is produced when running the blocks 38 within the security program 28. The movement of blocks 38 from the games program 20 and into the security program 28 is undertaken by the software toolkit 22 during the production of the executable program file 34.

It will be appreciated that security measures additional to those described and illustrated in FIG. 2 may be incorporated by way of the software toolkit 22. For example, the games program 20 may also be encrypted.

The techniques described above for obfuscation of code may be used alone to secure software or may be used in conjunction with the following emulation technique. The emulation technique which will now be described and illustrated with reference to FIG. 3, may be used in conjunction with other security techniques or it may be used alone.

It will be appreciated that a program, for example, in C++ language, is compiled to produce an instruction set for application to a processor. If a cracker can get clear access to the instruction set, for example, of a game, reverse engineering of the game can be carried out. FIG. 3 illustrates an emulation technique which can be used to hide instructions from crackers.

As indicated in FIG. 3, source code 2 is applied to a compiler 50 to produce an instruction set indicated at 52. However, the compiler 50 is arranged to encrypt the compiled instructions and is also arranged to provide instructions in a reduced instruction set format rather than the more usual native instructions.

As illustrated in FIG. 3, the compiler 50 is provided with a library 54 of templates 58 which, as described above with reference to FIG. 1, can selectively provide one of a number of instruction sets at 52. In this respect, the compiler 50 is arranged to select one of a number of keys 56 whereby a corresponding template 58 is selected for use in the production of the instruction set 52. A virtual processor or emulator 60 is also configured in software using the selected key by way of an emulator compiler 64. This enables the emulator 60 to act on the instructions in the instruction set 52 without needing to decrypt them.

By way of example, the instruction set obtained by the use of the template 58 with the key 0 might be encrypted by the addition of the value +3 to each variable value. The emulator 60, therefore, can understand that each variable must be reduced by three and can therefore execute the instructions. Thus, for example, if the MOV instruction should be 0 and the emulator receives the variable 3 it can understand that, for this instruction set, 3 is to be set to MOV and act accordingly. By this means, therefore, there is no clear and unencrypted instruction set input to the emulator 60.

In addition, the emulator 60 is arranged to produce a large series of instructions for each genuine instruction and to apply this large series of instructions to a CPU 62. For example, instead of instructing the CPU 62 to add 3 the emulator 60 might issue the string of instructions:

add 10,
subtract 7,
divide by 1,
multiply by 1.

This adds to the complexity of the instructions being fed to the CPU 62 and this complexity also acts to obfuscate the code for crackers.

It will be appreciated that using the emulator 60 as described will add to the real time required for processing and it is not, therefore, appropriate to run a games program on CPU 62 in this manner. Instead, parts only of the program are to be hidden from crackers using this technique. For example, if this technique is used in conjunction with the techniques described above, the security program 28, which may include blocks 38 from the games program 20, can be subject to the emulation technique.

It will be appreciated from the above that if during compilation a different key 56 is chosen, the instruction set 52 will be changed as will the emulator 60. This ability to use different instruction sets and emulators on different discs adds a further level of security as it enables different discs published by the same manufacturer to have different security. It is also significant that the instruction set 52 remains encrypted as this ensures that there is no clear instruction set available which might be used by crackers.

It will be appreciated that alterations and modifications may be made to the invention as described and illustrated within the scope of the appended claims.

The invention claimed is:

1. A computer-implemented method of producing obfuscated object code, the method comprising:
    substituting a variable in source code with a class template defining a plurality of functions of the variable, each of the plurality of functions indexed by a key value and associated with a series of operations resulting in an assignment of the variable in a manner obfuscating said assignment, wherein the series of operations reliably returns the variable to an assigned value, wherein a different key value is associated with each one of the plurality of functions defined in the class template, and wherein the method further comprises selecting a key value, which is associated with one of said plurality of functions; and
    compiling the source code by using a compiler to produce object code, wherein the compiler inserts in the object code the series of operations associated with one of the plurality of functions of the variable identified by the selected key value.

2. The method according to claim 1, wherein the series of operations comprises a plurality of operations from a group of operations including arithmetic operations and logical operations.

3. The method according to claim 1, wherein the source code is written in the C++ programming language.

4. A computer-implemented method of producing storage media having a secured executable program thereon, the method comprising:

obfuscating object code of a security program by substituting a variable in source code of the security program with a class template defining a plurality of functions of the variable, each of the plurality of functions indexed by a key value and associated with a series of operations resulting in an assignment of the variable in a manner obfuscating said assignment, wherein a different key value is associated with each one of the plurality of functions defined in the class template, and wherein the method further comprises selecting a key value, which is associated with one of said plurality of functions, and compiling the source code by using a compiler to produce the object code, wherein the compiler inserts in the object code the series of operations associated with one of the plurality of functions of the variable identified by the selected key value, and wherein the series of operations reliably returns the variable to an assigned value;

securing an executable program by associating the executable program with the security program which is arranged to control access to the executable program; and applying the secured executable program to a storage media.

5. The method according to claim 4, wherein the executable program and the security program are associated at object code level, the security program being arranged to encrypt the executable program.

6. The method according to claim 4, further comprising moving blocks of the executable program out of the executable program and relocating the blocks in the security program.

7. The method according to claim 4, wherein the security program is arranged to require the running of an authentication program.

8. The method according to claim 4, wherein the source code of the security program involves stored arrays and templates and utilizes pointers to navigate the arrays and templates.

9. The method according to claim 4, wherein the source code of the security program is written in the C++ programming language.

10. The method according to claim 4, wherein the storage media onto which the secured executable program is applied is an optical disc.

11. The method according to claim 10, wherein the secured executable program is applied to the optical disc by laser beam encoding.

12. The method according to claim 4, wherein the storage media onto which the secured executable program is applied is a memory unit associated with at least one computer.

13. A non-transitory storage media having an executable program and a security program thereon, wherein the security program controls access to the executable program, the security program is in object code, and the object code of the security program has been obfuscated by substituting a variable in source code of the security program with a class template defining a plurality of functions of the variable, each of the plurality of functions indexed by a key value and associated with a series of operations resulting in an assignment of the variable in a manner obfuscating said assignment, wherein a different key value is associated with each one of the plurality of functions defined in the class template, and wherein the method further comprises selecting a key value, which is associated with one of said plurality of functions, and compiling the source code by using a compiler to produce the object code, wherein the compiler inserted in the object code the series of operations associated with one of the plurality of functions of the variable identified by the selected key value, and wherein the series of operations reliably returns the variable to an assigned value.

14. The storage media according to claim 13, wherein the series of operations comprises a plurality of operations from a group of operations including arithmetic operations and logical operations.

15. The storage media according to claim 13, wherein the executable program and the security program are associated at object code level, and wherein the executable program is encrypted on the storage media and the associated security program enables decryption of the executable program.

16. The storage media according to claim 13, wherein blocks from the executable program have been relocated within the security program.

17. The storage media according to claim 13, wherein the security program is arranged to require the running of an authentication program.

18. The storage media according to claim 13, wherein the storage media is an optical disc on which the executable program and the security program are encoded.

19. The storage media according to claim 18, wherein the optical disc is one of: a CD, a CD-ROM, and a DVD.

20. The storage media according to claim 13, wherein the storage media is a memory unit associated with at least one computer.

21. The storage media according to claim 13, wherein the executable program is one or more of:
a games program;
a video program;
an audio program; and
other software.

* * * * *